United States Patent

Clepper

[15] 3,648,794
[45] Mar. 14, 1972

[54] POWER TAKEOFF FOR OPERATION OF ACCESSORY VEHICLES

[72] Inventor: Ventis A. Clepper, Route 1, Box 182, Hockley, Tex. 77447

[22] Filed: Feb. 16, 1970

[21] Appl. No.: 11,676

[52] U.S. Cl. ............................................. 180/14 R, 293/69
[51] Int. Cl. .......................................................... B60d 7/00
[58] Field of Search .......................... 180/14; 293/1, 60, 69

[56] References Cited

UNITED STATES PATENTS

| 3,336,996 | 8/1967 | Hautzenroeder | 180/14 |
| 2,636,568 | 4/1953 | Rutishauser | 180/14 X |
| 3,299,979 | 1/1967 | Restall | 180/14 |
| 2,883,069 | 4/1959 | Candlin, Jr. et al. | 213/76 X |
| 2,869,660 | 1/1959 | Miller et al. | 180/14 |
| 3,385,388 | 5/1968 | Restall | 180/14 |

Primary Examiner—Benjamin Hersh
Assistant Examiner—John P. Silverstrim
Attorney—Ranseler O. Wyatt

[57] ABSTRACT

A device for transmitting power from a vehicle to accessory vehicles, such as loaders, wherein the power takeoff has a funnel gear to receive the rotatable drive shaft of the accessory vehicle, enabling the power vehicle to engage the accessory vehicle by backing into contact therewith and to be released therefrom by forward motion.

4 Claims, 3 Drawing Figures

PATENTED MAR 14 1972
3,648,794
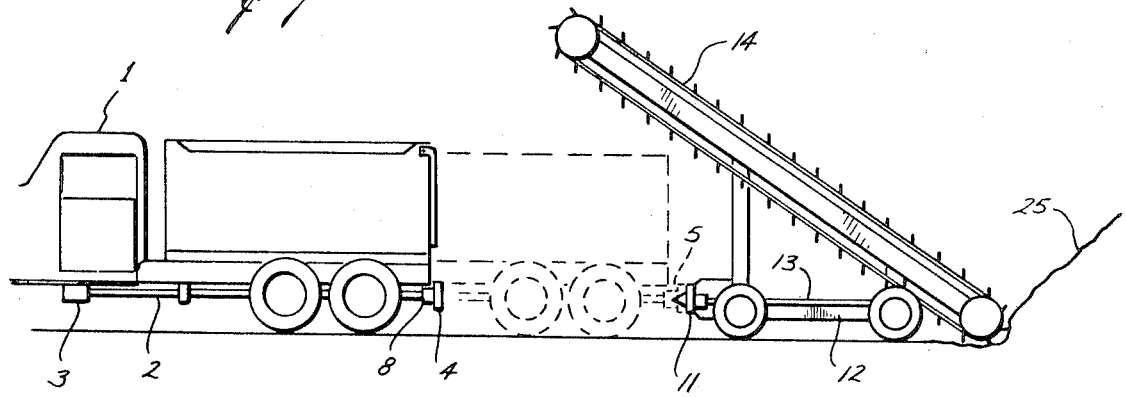
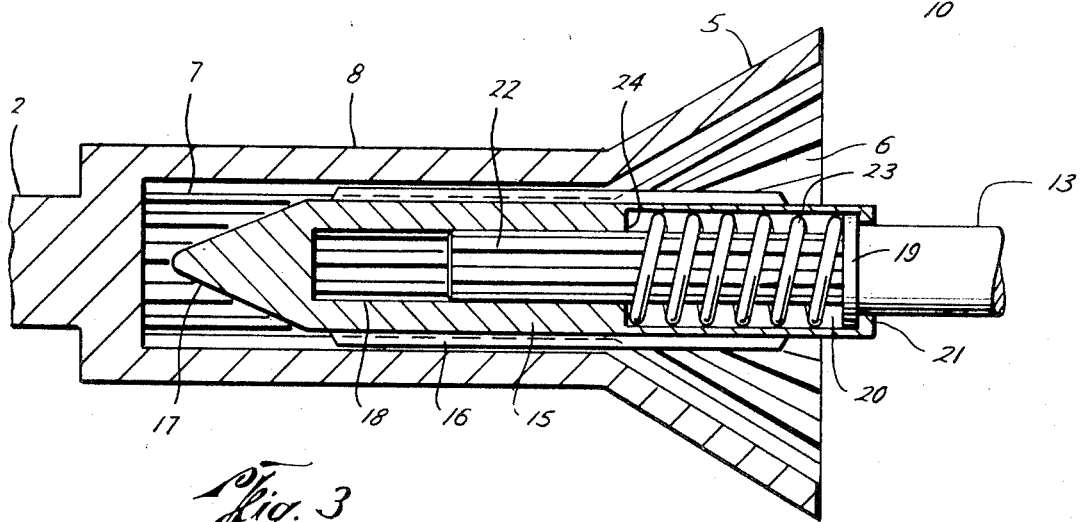
INVENTOR.
Ventis A. Clepper
BY
ATTORNEY 3,648,794

POWER TAKEOFF FOR OPERATION OF ACCESSORY VEHICLES

SUMMARY OF THE INVENTION

A power take off consisting of a funnel gear rotated by the source of power of the driven vehicle into which a rotatable gear on the drive shaft of an accessory vehicle may be received, said vehicles having means for guiding the gears into rotating relation and being movable out of rotatable relation by forward movement of the powered vehicle.

BRIEF DESCRIPTION OF THE DRAWINGS

FIG. 1 is a side elevational view of a powered vehicle and an accessory vehicle, showing, in dotted lines, the vehicle that is powered in working relation with the accessory vehicle.

FIG. 2 is a perspective view, showing the vehicle aligning means, and

FIG. 3 is a side elevational view, in cross section, of the coupling gears employed.

DESCRIPTION OF THE PREFERRED EMBODIMENT

In the drawings, the numeral 1 designates a vehicle having a source of power from which the drive shaft 2 extends and is rotated through the usual transmission and power take off 3. At the rear of the vehicle 1 is a bumper 4 anchored to the vehicle framework. The end of the drive shaft 2 is mounted in and rotates an elongated gear 8, which extends through said bumper, and said gear is outwardly flared, forming the funnel gear 5, which is internally threaded as at 6, the said threads being an extension of the threads 7 in the inside wall of the tubular elongated gear 8.

Cups 9, 9 are formed in the outer face of the bumper 4, which are adapted to receive the cones 10, 10 in the bumper 11, which is mounted on the accessory vehicle 12. A drive shaft 13 on the vehicle 12, rotates the operating equipment on said vehicle, such as the loader mechanism 14. Mounted on the extended end of the drive shaft 13 is the externally threaded elongated gear 15 having the threads 16 extending longitudinally thereof, and having its extended end tapered forming a point as 17.

An axial, internally threaded chamber is formed in the gear 15 and the end of the drive shaft 13 is internally enlarged forming the spring chamber 20, and the outer end of the chamber 20 has the internal peripheral flange 21 against which the flange 19 of the drive shaft 13 abuts. The drive shaft 13 is circumferentially reduced and externally threaded as at 22 and the coil spring 23 is mounted in the chamber 20 and abuts at one end against the flange 14 and at the other end against the shoulder 24. The threaded end of the drive shaft 13 extends into the internally threaded chamber 18, and normally, when not in connection with the funnel gear, the spring 23 will maintain the end of the drive shaft 13 at a position about midway of the chamber 18, so that upon compression of the spring 23, the drive shaft has room to move further into the chamber 18.

When the power vehicle backs into the accessory vehicle, such as the loader shown, the cones 10 and cups 9 will engage and assist the tapered member 17 in entering the funnel gear 5 and the drive shaft 13 will immediately commence rotation, and as the vehicle 1 continues its backward movement, the threaded member 16 will enter the elongated gear 8 and the drive shaft 13 will be in longitudinally yieldable rotatable connection with the drive shaft 2, rotating the mechanism of the vehicle 12, such as loading from a pile 25 of material to be loaded. As the vehicle 1 continues backing into the pile 25, to continue the loading process, the shocks experienced in such operation will be transmitted to the spring 23 and absorbed thereby, as the gear 22 reciprocates with the shocks in the housing 18. When the loading operation has been completed, the vehicle 1 will be moved forwardly, disengaging the respective gears 17, 16, and leaving the accessory vehicle 12 in position for the next loading operation.

What I claim is:

1. In a power take off for the operation of accessory vehicles; a rotatable drive shaft extending from the transmission of a powered vehicle, an elongated gear on the extended end of said drive shaft, a bumper on the rear of the powered vehicle and a funnel gear integral with said elongated gear and extending from the end thereof and said funnel gear being mounted in and being flush with the rear face of said bumper, an accessory vehicle having a drive shaft connected at one end to the operating mechanism of said accessory vehicle and the other end having a second elongated gear, and a bumper at one end of said accessory vehicle through which said second elongated gear projects said seconal elongated gear being operatively engaged with said funnel gear when said bumpers are abutting each other.

2. The device defined in claim 1 wherein said bumpers of said vehicles are provided with means for aligning said vehicles to move and maintain the respective gears in meshing relation.

3. The device defined in claim 1 wherein said gear on said accessory vehicle is yieldable longitudinally.

4. The device defined in claim 1 wherein said gear on said accessory vehicle drive shaft has an elongated externally threaded member, the forward end of said member being tapered, and said member having an axial chamber therein, said chamber being internally threaded, and being internally enlarged, at one end forming a spring chamber, the said drive shaft being reduced in circumference and externally threaded and extending into said chambers, a spring mounted on said drive shaft in said enlarged chamber maintaining the drive shaft in yieldable longitudinal rotatable connection with said elongated member.

* * * * *